May 1, 1962 W. P. DREWS 3,032,495
METHOD OF REMOVING WATER VAPOR FROM THE GASEOUS
PRODUCTS IN A HYDROFORMING PROCESS
Filed Dec. 31, 1953
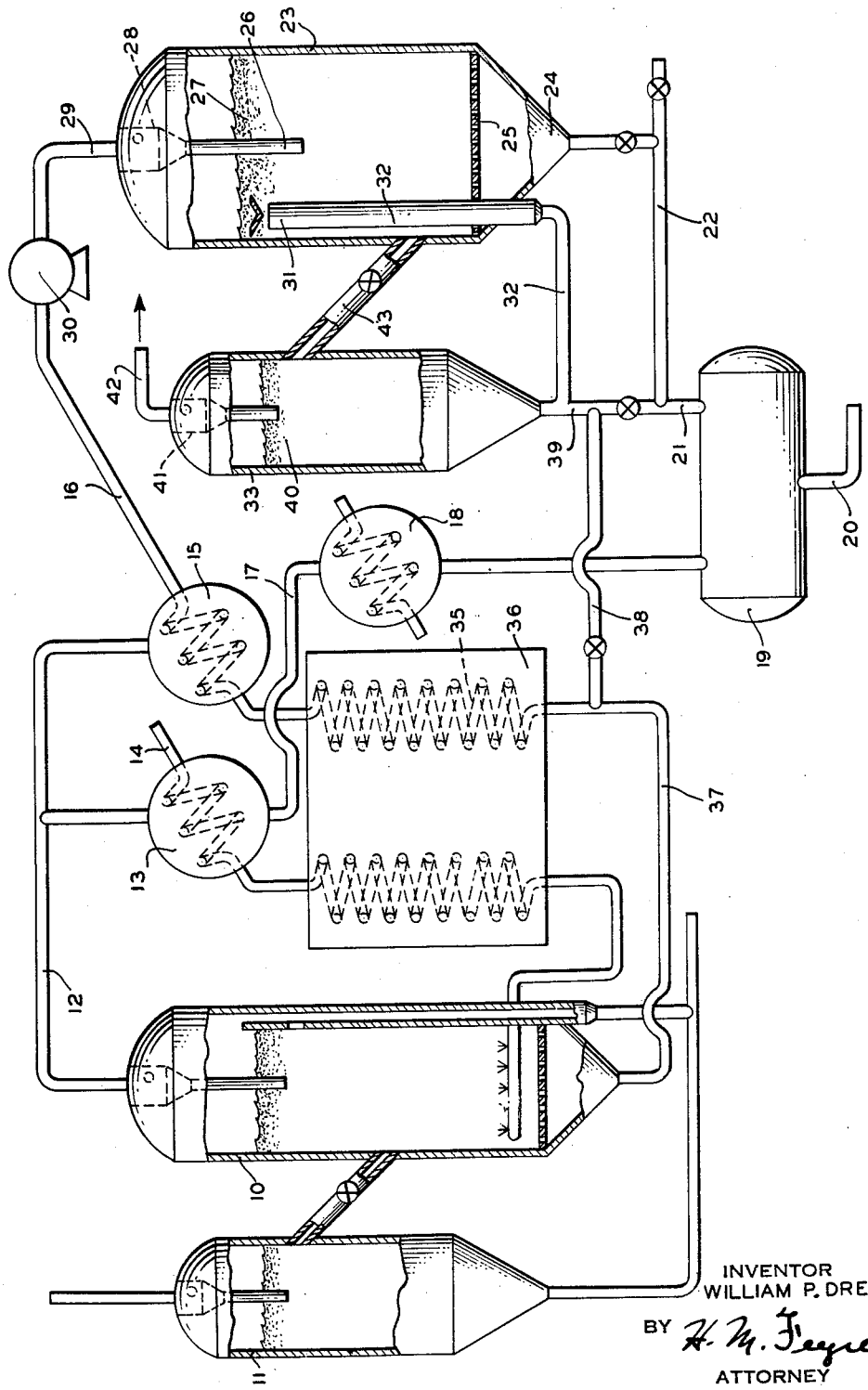
INVENTOR
WILLIAM P. DREWS
BY *H. M. Feigner*
ATTORNEY

United States Patent Office
3,032,495
Patented May 1, 1962

3,032,495
METHOD OF REMOVING WATER VAPOR FROM THE GASEOUS PRODUCTS IN A HYDROFORMING PROCESS
William P. Drews, Elizabeth, N.J., assignor to Esso Research and Engineering Company, a corporation of Delaware
Filed Dec. 31, 1953, Ser. No. 401,454
2 Claims. (Cl. 208—95)

This invention relates to the catalytic conversion of hydrocarbon fractions boiling within the motor fuel range of low knock rating into high octane number motor fuels rich in aromatics and particularly to a process whereby such conversion is effected by the fluidized solids technique.

Hydroforming is a well known and widely used process for treating hydrocarbon fractions boiling within the motor fuel or naphtha range to upgrade the same or increase the aromaticity and improve the anti-knock characteristics of said hydrocarbon fractions. By hydroforming is ordinarily meant a hydrocarbon conversion conducted at elevated temperatures and pressures in the presence of solid catalyst particles and hydrogen whereby the hydrocarbon fraction is increased in aromaticity and in which operation there is no net consumption of hydrogen. Hydroforming is ordinarily carried out in the presence of hydrogen or a hydrogen-rich recycle gas at temperatures of 750–1150° F. in the pressure range of about 50–1000 lbs. per sq. inch and in contact with such catalysts as platinum group metals upon a support such as alumina; or molybdenum oxide, chromium oxide, or, in general, oxides or sulfides of metals of groups IV–VIII of the periodic system of elements, alone, or generally supported on a base or spacing agent such as alumina gel, precipitated alumina or zinc aluminate spinel.

It has been proposed to effect the hydroforming of naphtha fractions in a fluidized solids reactor system in which naphtha vapors and hydrogen-rich gas are passed continuously through a dense, fluidized bed of hydroforming catalyst particles in a reaction zone, spent catalyst particles are withdraw from the dense bed in the reaction zone and passed to a separate regeneration zone where inactivating carbonaceous deposits are removed by combustion whereupon the regenerated catalyst particles are returned to the main reactor vessel or hydroforming reaction zone. Fluid hydroforming as thus conducted has several fundamental advantages over fixed-bed hydroforming such as (1) the operations are continuous, (2) the vessels and other equipment can be designed for single rather than dual functions, (3) the reactor temperature is substantially constant throughout the dense bed, and (4) the regeneration or reconditioning of the catalyst may be readily controlled.

A particular advantage of the foregoing fluidized solids operation has been the fact that the freshly regenerated catalyst can be utilized to carry part of the heat required for the hydroforming reaction from the regeneration zone into the reaction zone. It has been proposed in this connection to discharge hot, regenerated catalyst particles into a stream of hot, hydrogen-rich recycle gas in a transfer line, whereby the catalyst particles are subjected to a reconditioning treatment during their passage through the transfer line into the reactor. This reconditioning or pretreatment of the regenerated catalyst involves at least a partial reduction of higher catalytic metal oxides formed during regeneration to a lower or more catalytically active form of catalytic metal oxide. In view of the high temperature of the regenerated catalyst (1050–1200° F.), the exothermic character of the reaction between the hot, freshly regenerated catalyst and the hydrogen and the heat of adsorption of water formed by this reaction or contained in the hydrogen-rich recycle gas, it is necessary to make the transfer line very short and of relatively small diameter in order to keep the time of contact of the freshly regenerated catalyst and the hydrogen-rich gas sufficiently short to avoid over-pretreatment and/or thermal degradation of the catalyst.

It has been found that the group VI metals form a number of different oxides of varying catalytic activity and also that these several oxides can exist in amorphous and also in crystalline form. The catalytic activity depends to a great extent upon the particular form of the oxide. In general, the crystalline oxides are less active than the amorphous oxides.

Water has a very pronounced effect upon the physical characteristics of the catalytic metal oxide and upon many of the catalyst supports or spacing agents. Moreover, water or water vapor comes into contact with the catalyst in different ways and in varying amounts in hydroforming processes. For example, steam is frequently used to strip hydrogen or light hydrocarbon materials from spent catalyst before subjecting the catalyst to regeneration. During regeneration, water is formed by combustion of residual hydrogen and also hydrocarbon materials associated with the spent catalyst. Moreover, the pretreatment or partial reduction of the regenerated catalyst with hydrogen forms further amounts of water. This water or a substantial amount of this water remains in the process or recycle gas as water of saturation, the quantity remaining therein varying with the temperature of the cooling water available. Separation of this water of saturation or minimizing the amount of water in the recycle gas at temperatures below that of the available cooling water would involve the use of refrigeration. This would not only be expensive to install and to operate but it would also require an increase in the heat load in the recycle gas preheaters.

It is the object of this invention to provide the art with an improved method of removing the water of saturation from the recycle gas in a hydroforming reaction system.

It is a further object of this invention to remove the water of saturation from recycle gas in a hydroforming reaction system by contact with a solid adsorbent in a fluidized solids circulating system.

It is also an object of this invention to control the water content of recycle gas in a hydroforming reaction system in order to control the activity and selectivity characteristics of the catalyst.

These and other objects will appear more clearly from the detailed specification and claims which follow.

It has now been found that catalyst activity and selectivity in a hydroforming reaction system, particularly one using the fluidized solids technique, can be maintained by removing the water of saturation from the recycle gas or controlling the quantity of water in the recycle gas by passing the recycle gas through a dense, fluidized bed of a solid adsorbent in a system which is so arranged as to permit continuous regeneration and recycling of the solid adsorbent. It is possible in this way to reduce the water content of the recycle gas to any desired level without resorting to expensive refrigeration. By lowering the water content of the recycle gas in this manner and further lowering water partial pressure in the reactor as by avoiding the use of steam as stripping medium, minimizing hydrogen burning and by drying the naphtha feed it is possible to increase the catalyst-to-oil ratio even to the point of obtaining a heat-balanced operation.

Reference is made to the accompanying drawing which illustrates a schematic flow plan of one embodiment of the present invention.

In the drawing, a conventional fluid hydroforming reactor system comprising a reactor 10 and regenerator 11 arranged for continuous circulation of spent catalyst to the regenerator and regenerated catalyst back into the reactor in known manner is shown. Hot reaction products are taken overhead from reactor 10 through line 12 and passed through heat exchanger 13 in indirect heat exchange to fresh feed supplied through line 14 and/or through heat exchanger 15 in indirect heat exchange relation to recycle gas supplied through line 16. The partially cooled reaction products are then passed via line 17 through cooler 18 wherein the product stream is condensed by heat exchange with ordinary cooling water, whereupon the products are discharged into separator 19. Liquid hydroformate is withdrawn from separator 19 through line 20 and passed to suitable stabilizing and/or storage equipment while gaseous product or recycle gas is taken overhead through line 21.

The recycle gas or a major proportion of it is passed via line 22 into recycle gas drier 23. Drier 23 which comprises an inlet cone 24 and a perforated distributor plate or grid 25 is charged with a water adsorbent, regenerable solid such as activated alumina, silica gel, anhydrous calcium sulphate, barium oxide or the like of suitable size for fluidization. The velocity of the recycle gas through the drier is controlled to maintain the drier or adsorbent particles in the form of a dense, fluidized bed 26 having a definite level 27. The dense fluidized bed of drier solids is maintained at a temperature sufficiently low to permit the adsorption of the water contained in the recycle gas by the drier particles. This temperature will vary somewhat with the particular adsorbent used. Silica gel and anhydrous calcium sulphate are effective at temperatures up to about 150° F. while activated alumina is effective up to about 200° F. These materials are ordinarily used at temperatures of about 100° F. Barium oxide is effective at temperatures as high as about 100° F. and may be used at about 900° F. if a high temperature drying operation is desired. The dried recycle gas passes overhead from the dense bed 26 and through a cyclone separator 28 or the like for separating entrained drier particles and thence into outlet line 29. The dried recycle gas is compressed in compressor 30 and supplied to line 16 for recycling in the system.

In order to maintain the water absorbing properties of the bed 26 it is necessary to remove solid particles continuously and replace the withdrawn particles with dried or regenerated particles. Accordingly, a withdrawal well 31 is arranged in the dense bed 26 for receiving spent or equilibrium drier particles which are passed through conduit 32 into regenerator vessel 33 for the drier particles. Regeneration of the solid drier particles can be effected by heating and/or passing a desiccating gas therethrough. This may be done advantageously in accordance with the present invention by passing hot recycle gas therethrough. For example, the recycle gas passing through line 16 which is heated by indirect heat exchange with hot reaction products in heat exchanger 15 is then passed through heating coil 35 in furnace 36 for recycling to the reactor zone through conduit 37 connected to the bottom of reactor 10. A small amount of hot recycle gas is withdrawn from line 37 into valve-controlled line 38 and is then passed via line 39 into the bottom of the regenerator 33. If desired, some of the cool recycle gas removed from separator 19 through line 21 may be passed into line 39 and intermixed with the hot dry recycle gas in order to control the temperature and increase the volume of gas passing through the drier. The rate of flow of gas through drier 33 is controlled to maintain the drier particles as a dense, fluidized liquid simulating bed 40. Drying of the adsorbent particles may be effected by raising the temperature thereof to about 200° F. to 600° F., preferably about 300° F. and passing a gas therethrough in order to lower the water partial pressure or carry off the water vapor released. In the event that barium oxide particles are used, somewhat higher regeneration temperatures, for example about 1100–2000° F. will be required. The desiccating gas passes overhead from dense bed 40 through cyclone separator 41 for separating entrained drier or adsorbent particles and thence to outlet line 42 whereupon the gas is discarded to fuel. The dried adsorbent particles are withdrawn from dense bed 40 into transfer line 43 and discharged back into dense bed 26 in drier 23.

While the reactor-regenerator system is illustrated as of fluidized solids type which, of course, operate with continuous circulation of catalyst in known manner, the reactor could as well be of the fixed or moving bed type. The essence of the present invention involves the drying of the recycle gas or the lowering of its water content to a desired low value in a fluidized solids system as shown and described above. It is also within the purview of this invention further to lower the water partial pressure in the reaction zone as by avoiding the use of steam for stripping spent or regenerated catalyst, by minimizing the burning of hydrogen in the regeneration zone, by stripping the hydrogen-treated regenerated catalyst of water formed in that treatment and/or by drying the naphtha feed. By the use of these expedients, it is possible to maintain the concentration of water below about 1.0 mol. percent, preferably at about 0.5 to 0.7 mol. percent in which case it is possible to increase the catalyst-to-oil ratio to as high as about 5 to 1 without causing excessively large increases in $C_4$ and carbon yield. At these catalyst-to-oil ratios, a fluid hydroforming unit would be in substantial heat balance and would therefore require little, if any, preheat of the naphtha feed and the circulation of minimum quantities of hydrogen-rich or recycle gas.

The feed or charging stock to the hydroforming reactor may be a virgin naphtha, a cracked naphtha, a Fischer-Tropsch naphtha or the like having a boiling range of from about 125–450° F. or it may be a narrow boiling cut from within this range. The feed stock may be preheated alone or in admixture with recycle gas to about reaction temperature, for example, to about 800–1000° F.

The reactor vessel is charged with a suitable hydroforming catalyst such as a platinum group metal, for example, one containing about 0.01 to about 2.0 wt. percent platinum or 0.05 to 5.0 wt. percent palladium upon a support such as activated alumina, preferably an adsorptive or activated alumina derived from aluminum alcoholate. Alternatively, the catalyst may comprise from about 5 to 15 wt. percent of molybdic oxide or from about 10 to 30 wt. percent chromic oxide upon an adsorptive alumina or zinc aluminate spinel. If desired, minor amounts of stabilizers and promoters such as silica, calcium oxide, potassia, zirconia, or the like can be included in the catalyst. In fluidized solids reactor systems, the catalyst should be finely divided for fluidization, i.e. they should be between about 80 and 400 mesh in size or about 0–200 microns in diameter with a major proportion between about 20 and 100 microns.

Recycle gas which contains 50 volume percent or more of hydrogen is circulated through the reaction zone at a rate of from about 500 to 8000 cu. ft. per barrel of naphtha feed. The recycle gas may be preheated to temperatures of about 1000 to 1200° F.

The hydroforming reaction zone is maintained at temperatures between about 850 and 1050° F., preferably at about 900–950° F., and at pressures of about 50–1000 lbs. per sq. inch, preferably about 200 lbs. per sq. inch. During regeneration, the catalyst is ordinarily maintained at temperatures of about 1000–1200° F. while an oxygen-containing gas is passed thereover in order to burn off carbonaceous deposits. In fluidized solids systems as shown, the average residence time of the catalyst in the reaction zone or vessel is of the order of from about 3 to 4 hours while the average residence time of the catalyst in the regenerator is of the order of from 3 to 15 minutes.

The weight ratio of catalyst to oil introduced into the reactor should ordinarily be about 0.5 to about 3.5 although catalyst-to-oil ratios of 0.1 and less may be used with platinum catalyst. Somewhat higher ratios can be used at higher pressures or in systems wherein low water concentrations are present.

Space velocities or the weight in pounds of feed charged per hour per pound of catalyst in the reactor depends upon the age or activity level of the catalyst, the character of the feed stock and the desired octane number of the product. Space velocity for a molybdic oxide on alumina gel catalyst may vary, for example, from about 1.5 w./hr./w. to about 0.15 w./hr./w.

The foregoing description contains a limited number of embodiments of the present invention. It will be understood, however, that numerous variations are possible without departing from the scope of this invention.

What is claimed is:

1. In a hydroforming process wherein naphtha fractions are converted in contact with solid catalyst particles and in the presence of substantial amounts of hydrogen rich gas, the improvement which comprises condensing the liquid hydroformate product, separating the liquid products from the gaseous materials at substantially reactor pressures and at ordinary cooling water temperatures of about 70 to 120° F., passing the separated gaseous materials through a dense, fluidized bed of finely divided adsorbent materials to remove water vapor from said gaseous materials, compressing the dried gaseous materials, heating the same to elevated temperatures for recycling to the hydroforming reaction zone, continuously removing finely divided adsorbent materials from said dense bed, drying the adsorbent particles by passing a portion of the heated recycle gas therethrough, and recycling the dried particles to the dense bed.

2. The process as defined in claim 1 in which some of the gaseous materials as separated from the liquid hydroformate is intermixed with said portion of the heated recycle gas in order to increase the volume of gas passed through the spent drier particles.

References Cited in the file of this patent

UNITED STATES PATENTS

| | | |
|---|---|---|
| 2,366,372 | Voorhees | Jan. 2, 1945 |
| 2,406,112 | Schulze | Aug. 20, 1946 |
| 2,414,736 | Gray | Jan. 21, 1947 |
| 2,459,836 | Murphree | Jan. 25, 1949 |
| 2,602,771 | Munday | July 8, 1952 |
| 2,755,230 | Guernsey | July 17, 1956 |

OTHER REFERENCES

"Adsorption," Mantell, McGraw-Hill Book Co., N.Y., 1945, page 96.

"Thermofor Catalytic Reforming Reaches Commercial Stage," Payne et al., pages 117–123, Petroleum Refiner, May 1952.